United States Patent [19]
Yonekura

[11] Patent Number: 4,959,775
[45] Date of Patent: Sep. 25, 1990

[54] BUS REGULATING SYSTEM

[75] Inventor: Mikio Yonekura, Hachioji, Japan

[73] Assignee: Fanuc Ltd., Minamitsuru, Japan

[21] Appl. No.: 145,751

[22] PCT Filed: May 16, 1987

[86] PCT No.: PCT/JP87/00306

§ 371 Date: Dec. 22, 1987

§ 102(e) Date: Dec. 22, 1987

[87] PCT Pub. No.: WO87/07409

PCT Pub. Date: Dec. 3, 1987

[30] Foreign Application Priority Data

May 29, 1986 [JP] Japan ............... 61-124236

[51] Int. Cl.$^5$ .................. G06F 13/14; G06F 13/36
[52] U.S. Cl. .................. 364/200; 364/229.2
[58] Field of Search ................. 364/200 MS File

[56] References Cited

U.S. PATENT DOCUMENTS

| | | | |
|---|---|---|---|
| 4,494,192 | 1/1985 | Lew et al. | 364/200 |
| 4,583,160 | 4/1986 | Iguma | 364/200 |
| 4,602,327 | 7/1986 | LaViolette et al. | 364/200 |
| 4,630,193 | 12/1986 | Kris | 364/200 |

OTHER PUBLICATIONS

Elektronische Rechen Anlagen, vol. 21, No. 4, Aug. 1979, "Multiprocessor System For the Real-Time Digital Processing of Video-Image Series", Nicolae et al. pp. 171-183.
IBM Technical Disclosure Bulletin, vol. 28, No. 4, Sep. 1985, "Prioritized Data Communication System Using a Common Bus", pp. 1555-1556.
Wescon/79 Conference Record, San Francisco, CA, Sep. 18-20, 1979, Paper 28/1, "Multiprocessing With Single Board Computers—Hardware Considerations", by L. Soltesz, pp. 1-6.
Proceedings of the Fall Joint Computer Conference, Araheim, California, Nov. 14-16, 1967, vol. 31, "Intercommunication of Processors and Memory", pp. 621-633.

Primary Examiner—Eddie P. Chan
Attorney, Agent, or Firm—Staas & Halsey

[57] ABSTRACT

A bus regulating system has a bus shared by a plurality of modules (10, 20, 30) and a bus usage permit signal line (4) in the form of a daisy chain. The usage of the bus is flexibly controlled according to the tasks of the modules (10, 20, 30). Each of the modules (10, 20, 30) has in its bus control circuit (12, 22, 32) overlapping request determining circuit and continued use determining circuit. The overlapping request determining circuit issues an overlapping request signal even if a request signal is issued from another module when a higher level task is being processed. The overlapping request determining circuit does not issue a request signal if a request signal is issued from another module when a lower level task is being processed. The continued use determining means continuously keeps the right to use the bus when a higher level task is being processed, and abandons the right to use the bus after the bus has been used when a lower level task is being processed.

2 Claims, 4 Drawing Sheets

BUS REGULATING SYSTEM

BACKGROUND OF THE INVENTION

The present invention relates to a bus regulating system employing a so-called daisy chain. More particularly, the present invention is directed to a bus regulating system for changing bus usage priority with software.

Heretofore a daisy chain bus regulating system has been used. One example of such a bus regulating system is shown in FIG. 4 of the accompanying drawings. Designated in FIG. 4 is a bus regulating circuit 1 for determining a module that is permitted to use a bus, a bus 2, and a request signal line 3 for transferring a request signal *RQ by which each module requests use of the bus 2. A bus usage permit signal line 4 transfers a bus usage permit signal *BG issued by the bus regulating circuit 1 for permitting each module to use the bus 2. The bus 2 is shared by modules 10, 20 and 30. (In the present description, a signal which is a logic "0" when it is effective is associated with the sign "*" in front of the alphabetical letters that denote the signal.)

In FIG. 4, when one of the modules issues a bus usage request signal *RQ, the bus regulating circuit 1 sends a bus usage permit signal *BG to the line 4 if the bus is not occupied. Each module receives the bus usage permit signal *BG and exclusively uses the bus if it has issued the request signal *RQ. If a module has not issued the request signal *RQ, then it transfers the bus usage permit signal *BG to the next module.

In conventional systems, when the modules 10, 20 and 30 shown in FIG. 4 simultaneously issue request signals *RG, since the bus regulating system is in the form of a daisy chain, those modules closer to the left have higher bus usage priority and those closer to the right have lower bus usage priority. Therefore, bus usage priority is determined by the hardware arrangement, and a module which is processing a task with higher priority may not necessarily be allowed to use the bus with priority.

SUMMARY OF THE INVENTION

It is an object of the present invention to provide a bus regulating system which will solve the aforesaid problem and can allow use of a bus with priority according to the priority of tasks processed by modules.

To eliminate the above-mentioned problem, there is provided a bus regulating system having a plurality of modules, a bus shared by the modules, a bus regulating circuit, a bus usage permit signal line, and a bus usage permit signal line in the form of a daisy chain. The regulating system comprises overlapping request determining means for determining whether an overlapping request signal is to be issued or not when a request signal is being issued from another module, and continued use determining means for determining whether the obtained right to use the bus is to be abandoned or continuously kept after the bus has been used.

A module which is processing a task of lower priority inhibits the issuance of a request signal when a request signal is being issued from another module, and gives the right to use the bus to a module which is processing a task of higher priority. Conversely, when a module is processing a task of higher priority, it issues a request signal even if a request signal is being issued from another module, so that the right to use the bus is obtained.

When a module with the right to use the bus is processing a task of higher priority, the module does not immediately abandon but keeps the bus at the time the use of the bus is finished. When a module with the right to use the bus is processing a task of lower priority, the module immediately abandons the bus and gives the bus to a module that is processing a task of higher priority at the time the use of the bus is over.

DESCRIPTION OF THE PREFERRED EMBODIMENT

An embodiment of the present invention will hereinafter be described in specific detail with reference to the drawings.

Figure 1:
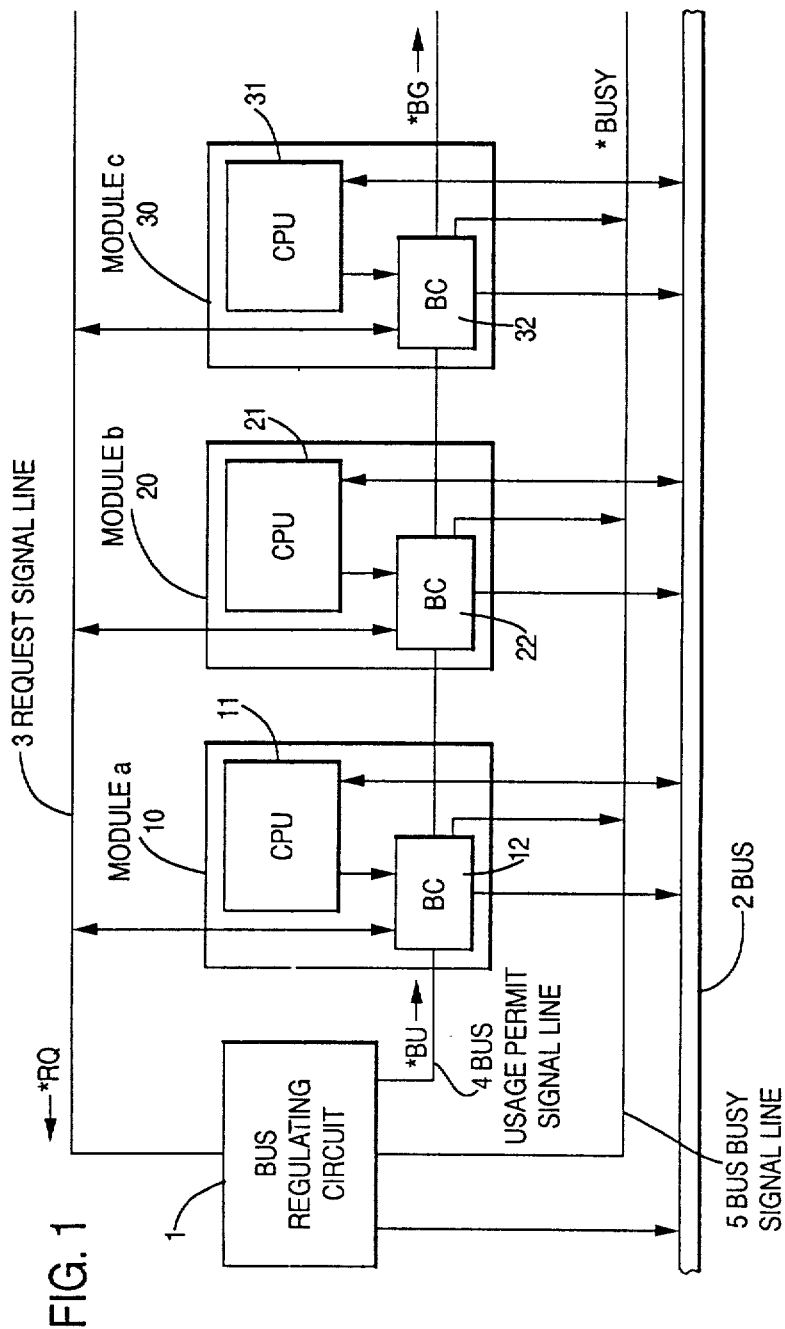
FIG. 1 is a block diagram of a bus regulating system according to an embodiment of the present invention.

FIG. 1 is a block diagram of a bus regulating system according to an embodiment of the present invention. Designated in FIG. 1 is a bus regulating circuit 1 for determining which module is permitted to use a bus 2, and a request signal line 3 for transferring a request signal *RQ by which each module requests use of the bus. (In the present description, as described above, a signal which has a logic "0" when it is effective is associated with the sign "*" in front of the alphabetical letters that denote the signal.) A bus usage permit signal line 4 transfers a bus usage permit signal *BG issued by the bus regulating circuit 1 for permitting each module to use the bus 2. Denoted at 5 is a bus busy signal line for transferring a bus busy signal *BBSY. The bus 2 is shared by modules 10, 20 and 30. Although the modules are not necessarily identical in structure, they include at least CPUs 11, 21 and 31, respectively, and bus control circuits (BC) 12, 22, and 32, respectively. Since the modules operate in the same manner for bus control, module 10 will hereinafter be described.

The CPU 11 has a ROM and a RAM contained therein, although they are not shown. The CPU 11 applies, to the bus control circuit 12, a bus request signal *IRQ and outputs DO1 and DO2 representative of conditions for controlling the bus. The bus control circuit 12 is responsive to the bus request signal *IRQ and the outputs DO1 and DO2 from the CPU 11 for performing various control modes such as requesting the bus 2, maintaining the right to use the bus 2, and abandoning the right to use the bus 2.

The bus control circuit 12 and control of the bus 2 will be described in detail below. The bus control circuits 22 and 23 have the same circuit arrangement as does the bus control circuit 12.

Figure 2:
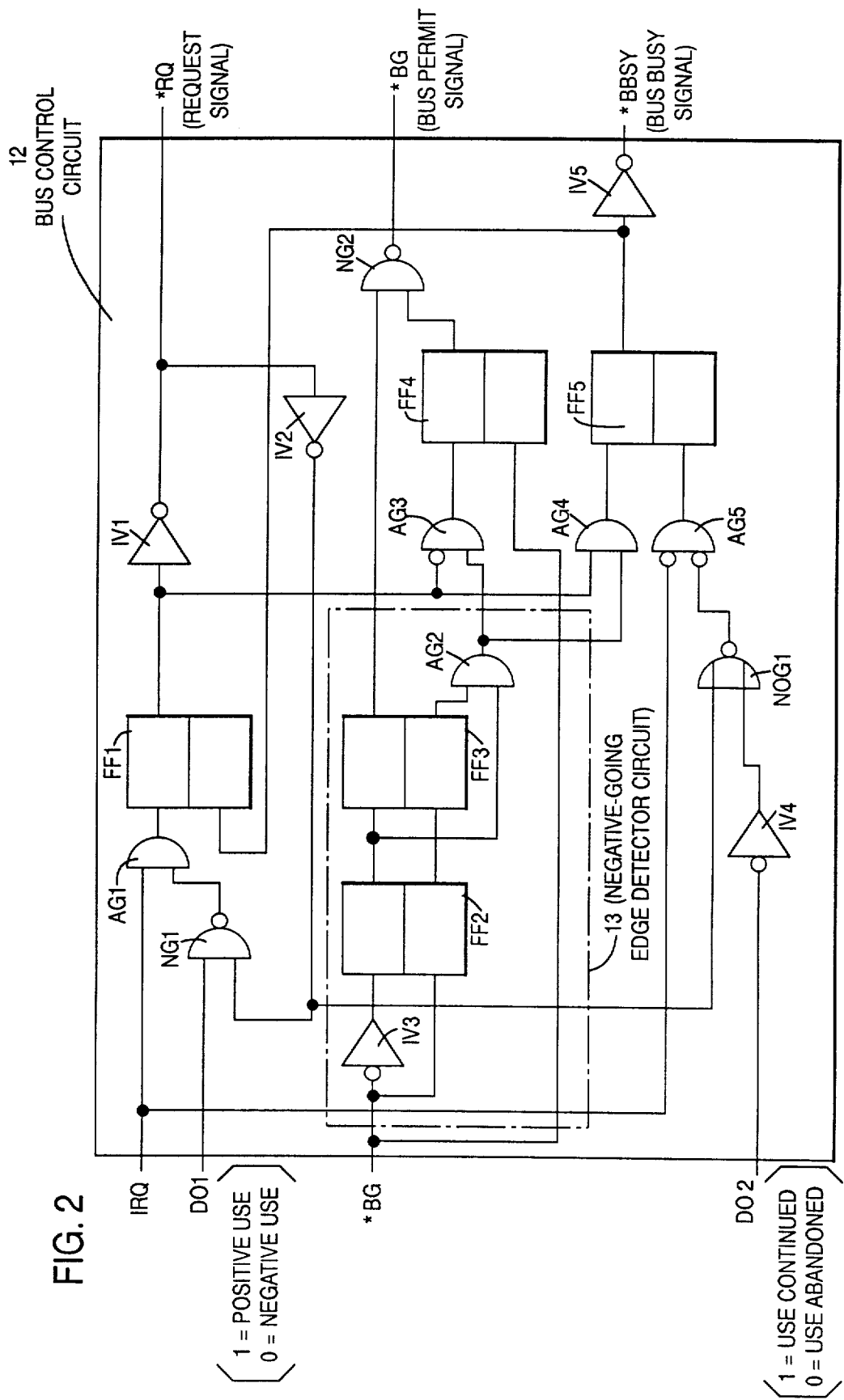
FIG. 2 is a circuit diagram of a bus control circuit shown in FIG. 1.

FIG. 2 is a circuit arrangement of the bus control circuit 12.

Various reference characters for circuit elements are defined as follows:

| | |
|---|---|
| AG1–AG5 | AND circuits |
| NG1–NG2 | NAND circuits |

| | -continued |
|---|---|
| NOG1 | NOR circuit |
| IV1-IV5 | NOT circuit |
| FF1-FF5 | flip-flops |

Various signals are as follows:

A signal IRQ is a request signal from the CPU 11. In response to this signal, the bus control circuit 12 decides whether or not it should issue a request signal.

A signal DO1 is a DO signal from the CPU 11. When it has a logic "1", the module 10 does not issue a request signal *RQ if a request signal is issued from another module even when a request signal IRQ is issued from the internal CPU 11. When the signal DO1 has a logic "0", the module 10 issues a request signal *RQ if a request signal IRQ is issued from the internal CPU 11 even when a request signal is issued from another module.

A signal *BG is a bus usage permit signal which is issued from the bus regulating circuit 1. When this signal is applied at the time the module 10 is issuing a request signal *RQ, the module 10 can, in principle, obtain the right to use the bus. If the module 10 is not issuing a request signal *RQ and another module requests the use of the bus, the signal *BG is applied to the other module.

A signal DO2 is a DO signal from the CPU 11. When this signal has a logic "1", the module 10 is using the bus. Even when the use of the bus by the module 10 is over, unless a request signal *RQ is issued from another module, the module 10 does not abandon the exclusive use of the bus, but maintains the right to use the bus. When the DO signal is "0", the module 10 abandons the right to use the bus immediately upon completion of use of the bus, and gives the right to use the bus to another module.

The signal *RQ is a request signal which is delivered over the request signal line 3 to the bus regulating circuit 1.

A signal *BBSY is a bus busy signal which is issued when the module 10 is using the bus.

Operation of the bus control circuit will be described.

A request signal IRQ is issued from the CPU 11. When the signal DO1 from the CPU 11 is "1" and if a request signal *RQ is being issued from another module, the module 10 does not use the bus 2. Therefore, if a request signal *RQ is being issued from another module, the output *RQ becomes "0" since the common bus line is employed, and the NG1 issues an output of "0". The FF1 is not set, no request signal *RQ is output even if the request signal IRQ is output from the CPU 11, and the bus 2 is not used. Conversely, when the output signal DO1 is "0" and the request signal IRQ is issued, the output from the NG1 is "1" even if a request signal *RQ is issued from another module and the request signal *RQ is "0". When the output from the CPU 11 is "1", the FF1 is set, and the module 10 attempts to obtain the right to use the bus 2.

The case where a bus usage permit signal *BG is issued from the bus regulating circuit 1 will now be described.

IV3, FF2, FF3, and AG2 jointly form a negative-going edge detector circuit 13. More specifically, when the bus usage permit signal *BG becomes "0", the AG2 issues an output of "1". If the module 10 is attempting to get the right to use the bus at this time, since the FF1 has been set to "1", the output of the AG4 becomes "1", setting the FF5, and the bus busy signal *BBSY becomes "0". The module 10 now informs the bus regulating circuit 1 of exclusive use of the bus 2, and keeps the right to use the bus 2. Conversely, even when the AG2 becomes "1" at a negative-going edge of the bus usage permit signal BG, the output of the AG4 does not become "1" unless the FF1 has been set, and the output of the AG3 becomes "1", setting the FF4. With the FF4 being thus set, the bus usage permit signal *BG is applied through FF2 and FF3 to cause the output of the NG2 to become "0". The bus usage permit signal *BG is now transferred to the next module, and the bus 10 does not keep the right to use the bus 2.

The function of the signal DO2 from the CPU 11 will be described below. When DO2 is "1", the module 10, even if it has finished the use of the bus, occupies the bus 2 and keeps it so that the module 10 can use it immediately, unless there is a request signal *RQ from another module. More specifically, even when the request signal IRQ becomes "0" after the CPU 11 has finished the use of the bus 2, the output of the IV4 is "0", and the output of the NOG1 is "1" unless the request signal *RQ becomes "0", i.e., the output of the IV2 becomes "1". The output of the AG5 is "0", and the FF5 is not reset, so that the right to use the bus is maintained. Therefore, when the CPU 11 tries to use the bus next time, it can immediately use the bus without communicating with the bus regulating circuit 1.

Conversely, when DO2 is "0", the output of the IV4 is "1" and the output of the NOG1 becomes "0". When the use of the bus is over and the request signal IRQ from the CPU 11 becomes "0", the output of the AG5 becomes "1", resetting the FF5, and the bus busy signal *BBSY becomes "1". The bus 2 is now open to use by other modules.

Figure 3:
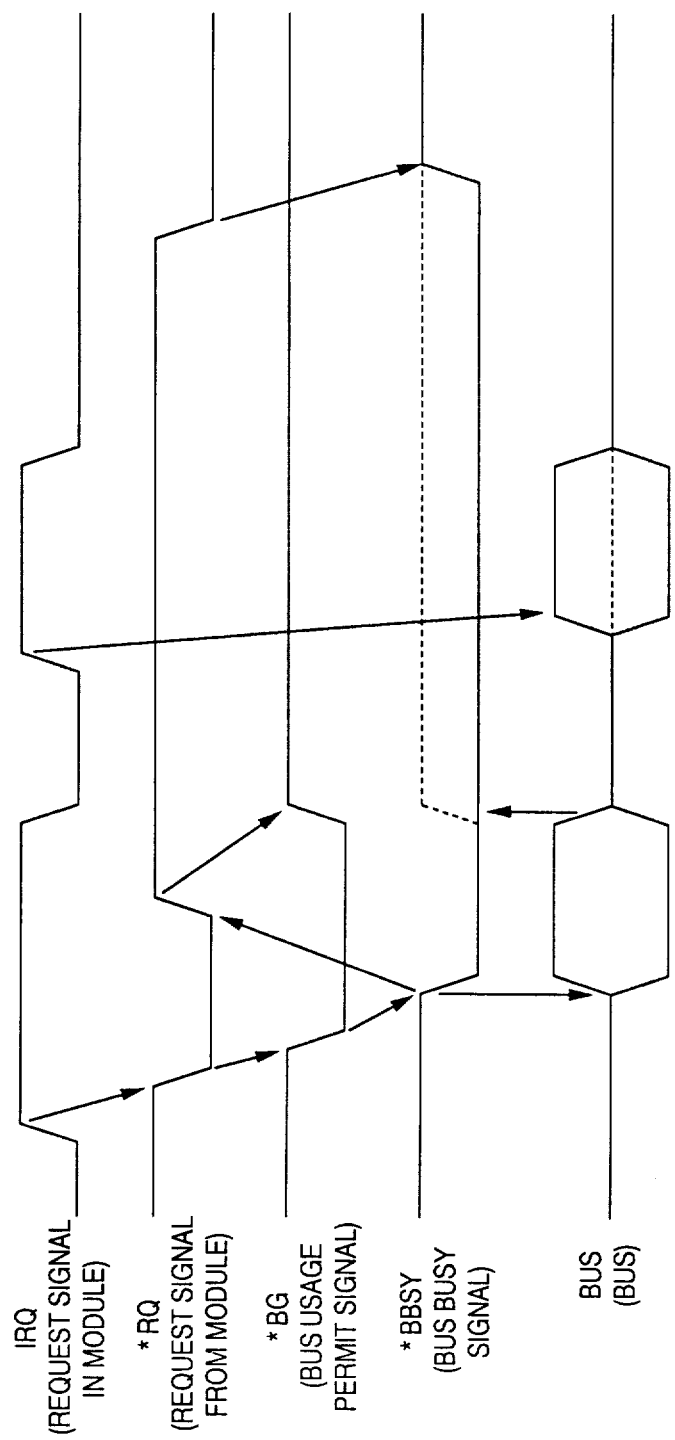
FIG. 3 is a timing chart of the bus control operation according to the embodiment of the invention.
Figure 4:
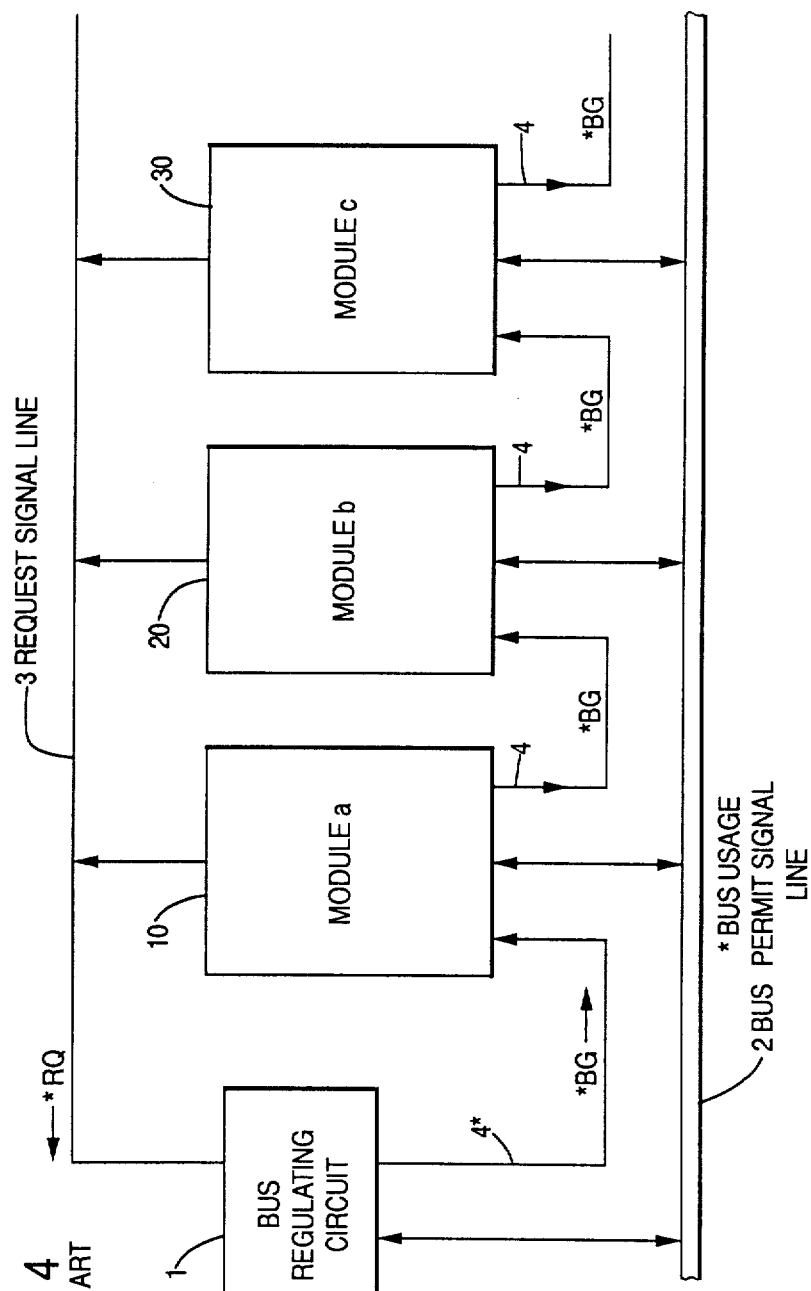
FIG. 4 is a block diagram of a conventional bus regulating system employing a daisy chain.

The sequence of operation will be described with reference to FIG. 3 which shows a timing chart for bus control. Denoted in FIG. 3 at *IRQ is a request signal issued from the CPU 11 in the module, *RQ is a request signal from the module, *BG is a bus usage permit signal, *BBSY is a bus busy signal, and BUS is the condition of how the module 10 uses the bus 2. These signals are denoted by the same reference characters as those used in FIG. 2.

When the CPU 11 issues a request signal IRQ and the signal DO1 is "0", the module 10 issues a request signal *RQ irrespective of the status of request signals *RQ from other modules.

When the request signal *RQ is applied to the bus regulating circuit 1, the bus regulating circuit 1 produces a bus usage permit signal *BG unless the bus 2 is not being used by another module.

When the bus usage permit signal *BG is input to the module 10, the module 10 obtains the right to use the bus 2 and issues a bus busy signal *BBSY.

Upon issuance of the bus busy signal *BBSY, the bus regulating circuit 1 and the other modules 20 and 30 are informed of the fact that the bus 2 is occupied by the module 10.

When the module 10 has finished the use of the bus 2, and if the output of the DO2 is "1", the module 10 does not abandon the right to use the bus 2. The bus 2 is kept by the module 10 unless there is a request signal *RQ from another module. When a next request signal IRQ is issued from the CPU 11, the module 10 can immediately use the bus 2. Conversely, when the output of the DO2 is "0", the bus 2 is made open to use by other modules immediately upon completion of the use of the bus 2 by the module 10. This condition is indicated by the dotted lines in FIG. 3. If a request signal *RQ is issued from another module before a next request signal IRQ is produced, the right to use the bus 2 is given to the other module, and the module 10 cannot immediately use the bus 2.

Thus, where there is a conflict among modules about the use of the bus 2, the priority can be changed according to tasks to be processed by issuing a request signal *RQ or abandon the right to use the bus 2 after the usage of the bus 2. Therefore, the processing of software can be performed efficiently.

While only three modules are involved in the above description, the invention is not limited to three modules.

With the present invention, as described above, each module has means for determining overlapping requests and means for determining continued use. Each module can use the bus with priority according to the priority of the task that is processed by the module. As a result, the processing of software can be performed efficiently.

The foregoing is considered as illustrating only the principles of the invention. Since numerous modifications and changes will readily occur to those skilled in the art, it is not desired to limit the invention to the exact construction and applications shown and described. Accordingly, all suitable modifications and equivalents may be resorted to, falling within the scope of the invention and the appended claims and their equivalents.

I claim:

1. A bus regulating system for regulating the right to use a plurality of modules commonly connected to a bus for transferring data, the modules coupled to each other in the form of a chain by a bus usage permit signal line means, said bus regulating system comprising:
   request signal line means for transferring a first request signal and commonly coupling the modules to each other;
   bus busy signal line means for transferring a bus busy signal and commonly coupling the modules to each other;
   a bus regulating circuit, coupled to said request signal line means, said bus busy signal line means and the bus usage signal line means, for inputting a bus usage permit signal to the bus usage permit signal line means in accordance with said first request signal and said bus busy signal;
   a microprocessor, mounted in each of the modules, for controlling each of the modules for outputting a second request signal for requesting use of the bus and outputting first and second control signals; and
   bus control circuit means, coupled to said microprocessor, each of said bus control circuit means mounted on each of said modules and coupled to each of said request signal line means, the bus usage permit line means, and said bus busy signal line means, for receiving, respectively, said second request signal output from said microprocessor, said first and second control signals output from said microprocessor, and the bus usage permit signal on the bus usage permit signal line, and outputting said bus busy signal on said bus busy signal line means, for determining whether or not said first request signal is to be output to said request signal line means in accordance with said second request signal and said first and second control signals, for obtaining a right to use the bus when the bus usage permit signal is input to said bus control circuit when said first request signal is output on said request signal line means by outputting said bus busy signal on said bus busy signal line means, for transferring the bus usage permit signal to a next one of said bus control circuit means when said first request signal is not output, and for outputting said bus busy signal on said bus busy signal line means while said second control signal is input and until said first request signal is output from another module.

2. A bus regulating system according to claim 1, wherein said bus control circuit means further receiving said first control signal and said second request signal without outputting said first request signal on said request signal line means when said first request signal is input from another one of said bus control circuit means, and for outputting said first request signal on said request signal line means regardless of whether said first request signal is output from said another one of said bus control circuit means when said first control signal is input.

* * * * *